April 27, 1943.  H. H. BASHORE  2,317,963
REINFORCED TREAD
Filed March 31, 1941
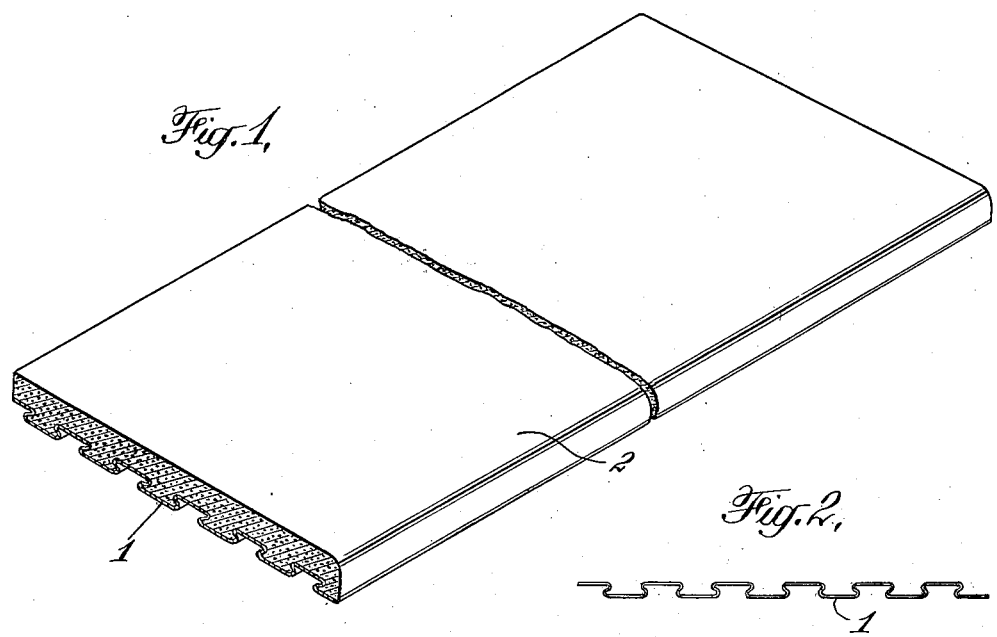
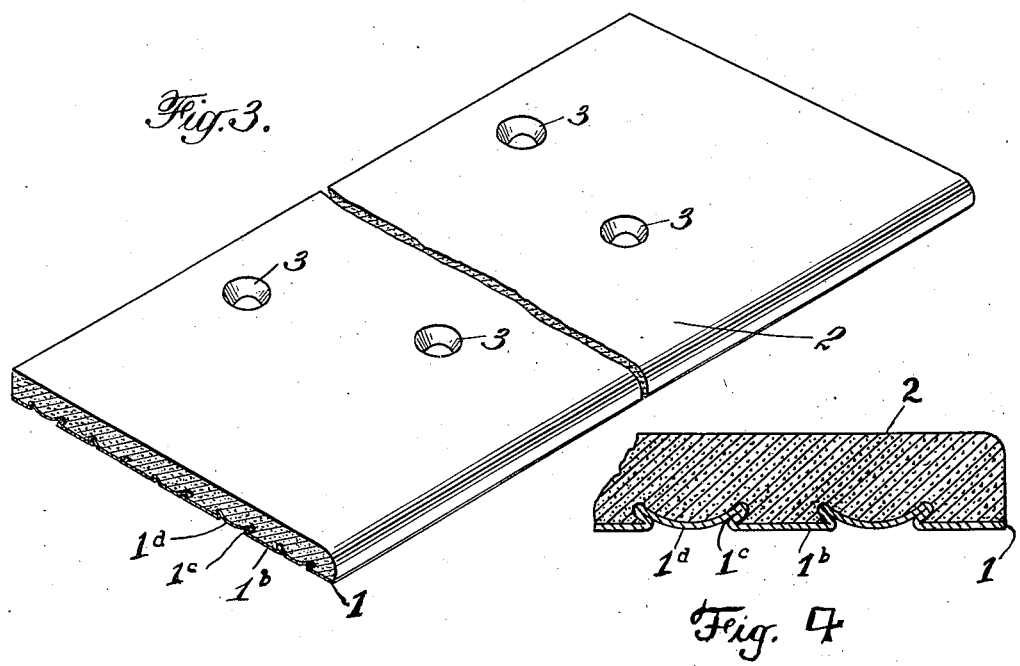
INVENTOR
Homer H. Bashore
BY
ATTORNEYS Patented Apr. 27, 1943

2,317,963

UNITED STATES PATENT OFFICE 2,317,963

REINFORCED TREAD

Homer H. Bashore, Morrisville, Pa., assignor to American Abrasive Metals Company, Irvington, N. J., a corporation of New York Application March 31, 1941, Serial No. 386,076

8 Claims. (Cl. 18—59)

This invention relates to reinforced treads and more particularly to reinforced, non-slip, wear-resistant treads, made up of a tread portion comprising abrasion-resistant particles suitably bonded with a synthetic resin binder and reinforced with a special, resilient, channeled, metal backing interlocked with the tread portion.

One of the objects of the invention is to provide a reinforced tread in which a special, resilient, metal reinforcement serves to increase the mechanical strength and efficiency of the surfacing material of the tread with which it is used. Another object of the invention is to increase the flexibility, flexural strength, impact strength, and compressive resistance of such treads. Another object is to provide a reinforced tread which is sufficiently strong to bridge the worn portions of stairs, etc. and to serve as a structural support, thus preventing the surface material of the tread from undue bending and consequent cracking. Other objects of the invention will appear from the following more detailed description.

The new treads of the present invention are particularly adapted for use as stair treads but they are also adapted for use, e. g., in the form of tile, flooring, etc.

The treads of the present invention are made up of a tread portion containing abrasive particles suitably bonded to form a non-slip, wear-resistant tread portion and a resilient, channeled and flattened reinforcing backing, with the tread portion and the backing suitably interlocked together.

The backing or reinforcement of the tread is made of resilient metal such as sheet metal which is capable of being readily bent into a corrugated or channeled form. The backing is advantageously made with undercut channels of such shape that, when the plastic mixture of the tread is applied thereto and subjected to sufficiently heavy pressure, the corrugated or channeled portions will be flattened to give a generally flat reinforcing metal backing with interlocking projections extending into the plastic composition of the tread.

The channeled backing with undercut channels, before it is subjected to the molding and flattening operation, is made up of alternating flat parallel sections and intermediate angular sections. The alternate flat sections are in different planes, and form with the intermediate angular portions undercut recesses alternately on the top and bottom of the reinforcing member. When the composition is applied to the top of the reinforcing member and the composition and member are subjected to heavy pressure, the flat portions at the top of the reinforcing member are depressed and form rounded sections $1a$ intermediate the flat sections $1b$ at the bottom of the reinforcing member so that in the final tread there are alternating flat and irregular rounded portions parallel to each other and with angular portions $1c$ of double thickness intermediate the flat and rounded portions and connected thereto. The angular portions are at an acute angle to the flat portions and extend into the composition of the tread and serve as interlocking projections. The tread composition is compressed into the channels and is of a similar density on both sides of the intermediate angular portions which form the interlocking projections extending into the plastic composition of the tread.

Such metal reinforcing elements can readily be made from cold rolled steel or by drawing or pressing operations to convert a sheet of resilient metal into a corrugated or channeled form, and particularly with undercut channels. The open channels thus formed, when subjected to high molding pressure, with the tread composition applied thereto, give a somewhat closed channel reinforcement which provides a valuable reinforcing backing for the tread, having a relatively flat section but with positive anchorage of the tread thereto.

The backing employed may be of varying width or length and the channels may run either longitudinally or transversely or diagonally with respect to the tread surface. The gauge of the resilient metal employed in making the channeled reinforcement can vary according to the strength needed. A 28-gauge metal was found sufficiently heavy to give advantageous results with stair treads. The number or size of the channels can be varied. The backing may advantageously be sandblasted on the side to which the plastic tread composition is applied so that the mixture will adhere better to the backing.

In combining the backing with the tread composition it is sometimes advantageous to apply a thermoplastic coating to the metal before applying the tread composition.

The tread composition itself can vary somewhat in its composition but in general it will contain abrasive or abrasion-resistant particles suitably bonded to give a hard, dense, moisture-resistant and long-wearing tread. The abrasive particles are advantageously bonded together with a synthetic resin binder, and particularly a synthetic resin binder which is heat hardenable, and which, in a heat hardened state, gives a tread capable of withstanding shocks and vibrations and also substantially free from "cold flow" under normal service conditions. In utilizing a synthetic resin or plastic binder for the abrasive grains it is also advantageous to add fibrous fillers such as asbestos or wood flour or both with resulting improvement in flexibility or resistance to impact.

Different abrasion-resistant materials can be employed in making the treads, as will be readily understood, and the size and proportion of abrasive grains can also be somewhat varied.

It is one advantage of the reinforced treads of the present invention that the surface of the tread will remain permanently non-slip until it is completely worn through, while the reinforcing backing will impart strength thereto even when the tread portion has been worn thin by use.

The invention will be further described in connection with the accompanying drawing illustrating in a somewhat conventional and diagrammatic manner one embodiment of the invention, but it is intended and will be understood that the invention is not limited thereto.

In the accompanying drawings

Fig. 1 shows a stair tread at the stage of its manufacture where the plastic tread composition is applied to the metal backing in the mold but before compression of the composition and baking in the mold;

Fig. 2 shows one form of flexible channeled metal backing before use;

Fig. 3 shows the finished tread; and

Fig. 4 is a view on an enlarged scale of a portion of the finished tread showing the form assumed by the metal backing after compression.

Referring first to Fig. 2, it will be noted that this backing 1 has a generally corrugated or channeled form with undercut channels or corrugations. Such a backing can readily be made of sheet metal by metal working operations which are well known in the art.

In making the stair tread the backing, such as shown in Fig. 2, is placed in the mold and the tread composition 2 applied thereto. Before subjecting the tread in the mold to compression the backing and tread composition have the form illustrated in Fig. 1; but when subjected in the mold to a high pressure of e. g. 10,000 pounds per square inch, the tread composition is highly compressed, the backing is flattened and the channels changed from open channels to more or less closed channels, giving a generally flattened form but with metal projections extending into the tread and effectively interlocking the tread portion with the backing as illustrated in Fig. 3. The high pressure to which the tread is subjected during molding causes the tread composition to flow, and the sheet metal to be changed from an open channeled to a flattened structure and with the resulting flattened backing and highly compressed tread portion effectively interlocked.

Stair treads may need to be attached to their supports by bolts or screws. The holes or openings for such attaching devices are advantageously made by boring holes which extend through the flat portions of the metal backing, as shown at 3 in Fig. 3.

With heat hardenable synthetic resins as the binders for the abrasive particles, etc. of the tread, subsequent baking or heat hardening operations may be required subsequent to or as a part of the molding operation. Such heat hardening or baking operations are carried out at a high temperature and the resulting stair tread, on cooling, tends to become deformed in shape because of the greater contraction of the hardened tread portion than of the metal backing. I have found that this objection can be overcome by imparting to the molded tread before heat hardening a somewhat convex shape, as by clamping the treads on a somewhat curved support so that, after heat hardening, the contraction of the tread portion will decrease the curvature of the molded tread. It is difficult to give to the tread just the right reverse curvature to compensate for the differential contraction on cooling; but the stair tread can advantageously be given a somewhat excess reverse curvature, to leave it with an appreciable but somewhat lessened reverse or convex curvature after heat hardening, and the stair tread after cooling can then be given a straightening treatment to remove the remaining curvature, e. g., by passing it between three rollers so set as to impart the necessary straightening operation to the tread. It is more advantageous to straighten the tread in this way, with resulting compression of the tread portion than to attempt to straighten a concave molded tread where there might be danger of cracking of the tread portion.

The reinforced treads of the present invention have greatly increased resistance to cracking, impact and compression as compared with treads which are not reinforced. The special channeled reinforcement used in the new treads increases the mechanical efficiency of the tread in mounting, gives greater resistance to cracking on bending and dropping, and resistance to impact and compression. An unreinforced tread is liable to crack when mounted on an uneven surface, such as the worn portion of stairs or floors, and is liable to break when bent, dropped or compressed. The reinforcement used in the new treads increases the resistance to compression, e. g., by around 400% and may increase the longitudinal flexibility by as much as 800% or more and may as well increase the longitudinal flexural strength by as much as 400% or more. The new reinforced treads are therefore well adapted for use, e. g. on worn portions of stairs or floors to bridge the gap of the worn portion and eliminating the necessity of any filling in to level off the uneven surface.

The reinforcement of the treads also facilitates the fastening of the tread by screws or bolts and reduces the danger of cracking when so fastened, thus allowing for more secure fastening and preventing the screws or bolts from coming loose.

The new treads have the advantage that treads which are relatively light in weight can be made which nevertheless have a sufficient strength to adapt them for use for stair treads, etc.

In making treads with a resin binder it is desirable to make the treads somewhat more flexible and to increase their impact and flexural strength by the addition of asbestos or wood flour or both to the tread composition.

In order to obtain a sufficiently uniform mixture of the tread composition it is advantageous to use a part at least of the resin binder in liquid form and subject the grains and fiber to prewetting therewith before compounding with other constituents such as fillers and powdered resin. When a liquid resin and a powdered resin are both used the proportions can be somewhat varied but the liquid resin is desirably used for prewetting the grains and fiber in amount sufficient for that purpose.

The resins used should be such as will impart the necessary bonding action to the grains and to admixed fibers, fillers, etc. to insure a dense, water-resistant tread after molding. The nature of the resins should also be such as will prevent undesirable flowing or cold flow of the finished tread and also avoid undue brittleness. The liquid and powdered resins, when used, may both be thermo-reactive or thermo-setting resins or should be of such nature and proportions that when subjected to heat hardening either during or after molding the hardened composition will have the desirable properties above mentioned.

As an example of a composition suitable for the tread, may be mentioned the following: Abrasive particles such as aluminum oxide (Aloxite) or silicon carbide, 74 parts; liquid thermo-setting resin, 0.75 part; iron oxide, 2 parts; ½-inch asbestos fiber, 8 parts; and powdered thermo-setting resin 15.25 parts.

With such a composition the abrasive and asbestos are advantageously first mixed with the liquid resin and the other ingredients subsequently added. The admixed composition is molded by placing the metal backing in the mold and then placing the composition above the metal backing in a suitable tread mold and then subjecting the composition and backing to a molding pressure of about 10,000 pounds per square inch with resulting deformation of the channeled backing to produce a relatively flat channeled section with the positive anchorage features and other advantages above referred to.

While with some compositions cold molding and subsequent baking will produce a satisfactory product, it is in general more advantageous to subject the composition to hot molding which may be only for a short period of time, after which the molded tread may be removed from the mold and subjected to a baking operation to further harden the resin binder. As above explained, this further baking operation is advantageously carried out with the tread held in a frame or secured to a backing to give the tread a reverse or convex warp so that when the resin shrinks on cooling the tread assumes an approximately flat position instead of becoming concave as it would if it were molded flat and then cooled.

Instead of first molding the tread and subsequently baking it, the complete baking operation can be carried out in the same hot press used for molding, e. g. by holding the article in the heated press at 10,000 pounds pressure for a sufficient time; or the hardening may be in part carried out in the mold and finished by subsequent baking.

The subjecting of the backing and tread composition to the high pressure during molding not only consolidates and compresses the tread composition but causes deformation and flattening of the channel backing to give a closed channel reinforcement with a relatively flat section but with positive anchorage features for the tread composition. The use of a resilient, channeled, metal backing which is capable of being thus flattened gives to the finished tread a desirable increased rigidity combined with a limited but desirable resiliency.

It will thus be seen that the present invention provides improved reinforced treads, well adapted for use as stair treads or for flooring, tiles, etc., where a non-slip, wear-resistant tread is desirable, capable of withstanding hard usage, and having many advantages, such as those hereinbefore pointed out.

I claim:

1. A reinforced tread made up of a tread portion and a reinforcing backing, the tread portion comprising abrasion-resistant particles suitably bonded to form a non-slip, wear-resistant tread portion, and the backing being in the form of a resilient, sheet metal backing with projections interlocking the tread portion thereto, said resilient sheet metal backing having alternating flat and irregular rounded portions parallel to each other and with angular portions of double thickness intermediate the flat and rounded portions and connected thereto, said angular portions being at an acute angle to the flat portions and extending into the tread portion and forming the interlocking projections therewith, and the tread portion being of similar density on both sides of said angular intermediate portions of the backing.

2. A reinforced tread made up of a tread portion and a reinforcing backing, the tread portion comprising abrasion-resistant particles suitably bonded with a heat hardened, synthetic resin to form a non-slip, wear-resistant tread portion, and the backing being in the form of a resilient, sheet metal backing with projections interlocking the tread portion thereof, said resilient sheet metal backing having alternating flat and irregular rounded portions parallel to each other and with angular portions of double thickness intermediate the flat and rounded portions and connected thereto, said angular portions being at an acute angle to the flat portions and extending into the tread portion and forming the interlocking projections therewith, and the tread portion being of similar density on both sides of said angular intermediate portions of the backing.

3. The method of producing a reinforced, non-slip, wear-resistant tread which comprises subjecting to high pressure a resilient, open channeled, sheet metal backing and a tread composition comprising abrasive particles and a binder therefor, the pressure being sufficient to mold the tread composition and to convert the open channeled backing into a flattened, closed channeled backing, said sheet metal backing having alternating flat portions and intermediate angular portions connecting them and being converted by the molding pressure into a backing having alternating flat and irregular rounded portions parallel to each other and with angular portions of double thickness intermediate the flat and rounded portions and connected thereto and arranged at an acute angle to the flat portions and extending into the tread composition.

4. The method of producing a reinforced non-slip, wear-resistant tread which comprises placing in a mold a resilient, open channeled, sheet metal backing having alternating flat portions connected by intermediate angular portions, placing in the mold a tread composition comprising abrasive particles and a heat hardenable resin binder, subjecting the backing and tread composition to a high pressure sufficient to mold the tread and to convert the open channeled backing into a flattened, closed channeled backing having alternate flat and irregular rounded portions parallel to each other and with angular portions of double thickness intermediate the flat and rounded portions and connected thereto and arranged at an angle to the flat portions and extending into the tread composition, the tread composition being heated to harden the heat hardenable resin binder.

5. The method of producing a reinforced, non-slip, wear-resistant tread which comprises subjecting to high pressure a resilient, open channeled, sheet metal backing having alternating flat portions connected by intermediate angular portions and a tread composition comprising abrasive particles and a thermo-setting synthetic resin binder therefor, the pressure being sufficient to mold the tread composition and to convert the open channeled backing into a flattened, closed channeled backing having alternate flat and irregular rounded portions parallel to each other and with angular portions of double thickness intermediate the flat and rounded portions and connected thereto and arranged at an angle to the flat portions and extending into the tread composition, said tread being subjected to heat to harden the resin and being held in position with a reverse curvature during such hardening, and the resulting tread being subsequently subjected to a straightening treatment.

6. A reinforced tread made up of a tread portion and a reinforcing backing, the backing being in the form of a resilient, sheet metal backing with projections interlocking the tread portion thereto, said resilient sheet metal backing having alternating flat and irregular rounded portions parallel to each other and with angular portions of double thickness intermediate the flat and rounded portions and connected thereto, said angular portions being at an acute angle to the flat portions and extending into the tread portion and forming the interlocking projections therewith, and the tread portion being of similar density on both sides of said angular intermediate portions of the backing.

7. A tread of substantially uniform thickness comprising a tread portion of substantially uniform density throughout and a reinforcing backing of sheet metal having projections interlocking the tread portion thereto, said sheet metal backing having alternating flat and irregularly rounded, downwardly convex portions and angular portions of double thickness intermediate the flat and rounded portions and connected thereto, said angular portions being embedded in the tread portion and extending at an acute angle to the flat portions.

8. A tread of substantially uniform thickness comprising a reinforcing backing sheet of metal and a non-slip, wear-resistant tread portion of abrasion-resistant particles bonded with a synthetic resin, said sheet metal backing having alternating flat and irregularly rounded, downwardly convex portions and angular portions of double thickness intermediate the flat and rounded portions and connected thereto, said angular portions being embedded in the tread portion and extending at an acute angle to the flat portions.

HOMER H. BASHORE.